Patented Apr. 26, 1927.

1,626,362

UNITED STATES PATENT OFFICE.

JOHN K. SPEICHER, OF KENVIL, NEW JERSEY, ASSIGNOR TO HERCULES POWDER COMPANY, OF WILMINGTON, DELAWARE, A CORPORATION OF DELAWARE.

OXIDIZED PINE OIL FOR PIGMENTS.

No Drawing.      Application filed July 20, 1926. Serial No. 123,793.

In grinding pigments for paints, lacquers, etc., the pigment is intimately mixed in a ball mill, roller mill or stone mill, etc., with a vehicle, such as castor oil, butyl alcohol or butyl acetate in the case of lacquers, or linseed oil or other drying oil plus turpentine or mineral spirits in the case of varnishes. During the grinding, each particle of pigment becomes coated with a thin film of oil. When such a mixture of pigment and oil is added to a varnish or lacquer, the pigment is readily dispersed throughout the liquid, forming a varnish enamel or lacquer enamel of smooth texture and high gloss. The number of substances possessing the property of readily wetting pigments and otherwise suitable for use in the finished varnish or lacquer is limited.

I have discovered that oxidized pine oil may be added to a pigment or combination of pigments, and the mixture ground in any of the common types of pigment mills, the proportions depending upon the particular pigments and the type of mill used. The amount of oxidized pine oil used may be from 5 to 50 parts by weight per 100 parts of the total mixture.

Pine oil is known to be a complex mixture of different substances, including terpineol, methyl chavicol, borneol, fenchyl alcohol, terpene hydrocarbons and smaller amounts of several other bodies. It has a specific gravity of about .93, while approximately ninety per cent distills between 190° and 225° C. When pine oil is oxidized under proper conditions, it contains different oxidized substances adapted to colloid nitrocellulose, principally the ketones camphor and fenchone. Another portion of the pine oil is oxidized to inert bodies.

Pine oil may be oxidized by different methods, my invention not involving any particular process for obtaining the oxidized pine oil. The operation may be so conducted that more or less of the pine oil remains unaltered. By one method of oxidation, the pine oil is treated with 4.2 times its weight of an oxidizing mixture consisting of fifteen per cent sodium bichromate, twenty per cent of sulfuric acid of 66° Bé. and sixty-five per cent of water. Agitation is employed at a temperature of 21–32° C., with some cooling, since the reaction is exothermic. The crude oxidized pine oil is then refined by steam distillation. The oxidized pine oil may then be dehydrated say by heating for one and one-half hours to 150° C. with two per cent of fuller's earth, the latter being then separated from the liquid, which is then distilled and collected in one lot. If desired, the process may be reversed; that is, the pine oil may be dehydrated, followed by removal of forty to seventy-five per cent of the product by distillation, and the residue oxidized as hereinbefore described. No claim is made in this application for the treatment of pine oil with fuller's earth for the purpose of dehydration as such forms the subject matter of an application for patent filed July 20, 1926, by Irvin W. Humphrey, Serial No. 123,814.

The following are examples of specific adaptations of my invention:

| | Parts by weight. |
|---|---|
| Zinc oxide | 65 |
| Carbon black | 1–2 |
| Oxidized pine oil | 53 |

Oxidized pine oil may also be used as a pigment grinding medium in combination with other media. An example of such a combination is:

| | Per cent weight. |
|---|---|
| Pigment | 66 |
| Oxidized pine oil | 20 |
| Xylol | 8 |
| Castor oil | 6 |

It will be understood that in specifying oxidized pine oil, I mean to include pine oil which has been subjected to an oxidizing treatment that may effect the oxidization of only a part of the constituents and also to include constituents that may be separated from the pine oil and subjected to an oxidizing treatment that may oxidize part or all of such constituents. It is preferred, however, to subject pine oil, without separation of some of its constituents, to the oxidizing treatment and dehydrating treatment hereinbefore described, the product having been found to be particularly well adapted to my purpose; and in the examples of my invention hereinbefore specified, the oxidized pine oil used is prepared by such treatments.

A particular advantage in using oxidized pine oil for pigment grinding is that, because of its high boiling point, there is very little solvent loss when an open or uncovered grinding mill is used, and the oxidized pine oil contained in the finished lacquer, enamel or paint contributes its advantages in producing flexibility and high gloss to the coating.

Having now fully described my invention, what I claim and desire to protect by Letters Patent is:

1. The method of preparing pigments for paints, varnishes, lacquers, enamels and other uses, which comprises grinding the pigment in admixture with oxidized pine oil.

2. The method of preparing pigments for paints, varnishes, lacquers, enamels and other uses, which comprises grinding the pigment in admixture with oxidized pine oil, the oxidized pine oil being from five to fifty parts of the weight of the total mixture.

3. The method of preparing pigments for paints, varnishes, lacquers, enamels and other uses, which comprises grinding the pigment in admixture with substances adapted to coat the ground particles and promote the dispersion of the pigment throughout the material to which it is to be adapted, one of the said substances being oxidized pine oil in a proportion not less than five per cent of the total mixture.

4. The method of preparing pigments for paints, varnishes, lacquers, enamels and other uses, which comprises grinding the pigment in admixture with approximately one-half its weight of a medium adapted to wet the ground particles and promote their dispersion throughout the material to which it is to be added, said medium comprising oxidized pine oil.

In testimony of which invention, I have hereunto set my hand, at Kenvil, New Jersey, on this 17th day of June, 1926.

JOHN K. SPEICHER.